United States Patent

Criel

[11] Patent Number: 5,802,663
[45] Date of Patent: Sep. 8, 1998

[54] WIPER BLADE WINDSHIELDS OF MOTOR VEHICLES

[75] Inventor: Paul Criel, St. Truiden, Belgium

[73] Assignee: Robert Bosch GmbH, Stuttgart, Germany

[21] Appl. No.: 875,411
[22] PCT Filed: Oct. 31, 1996
[86] PCT No.: PCT/DE96/02073
§ 371 Date: Jul. 10, 1997
§ 102(e) Date: Jul. 10, 1997
[87] PCT Pub. No.: WO97/21569
PCT Pub. Date: Jun. 19, 1997

[30] Foreign Application Priority Data

Dec. 12, 1995 [DE] Germany ............... 195 46 256.4

[51] Int. Cl.⁶ ............................................. B60S 1/38
[52] U.S. Cl. ............................................. 15/250.452
[58] Field of Search .................. 15/250.44, 250.451, 15/250.452, 250.453, 250.454, 250.46, 250.361, 250.48, 250.38

[56] References Cited

U.S. PATENT DOCUMENTS

| 2,792,585 | 5/1957 | Scinta | 15/250.451 |
| 3,094,734 | 6/1963 | Hoyler | 15/250.452 |
| 4,658,463 | 4/1987 | Sugita et al. | 15/250.452 |
| 5,231,730 | 8/1993 | Schmid et al. | 15/250.452 |
| 5,412,834 | 5/1995 | Burkaid et al. | 15/250.452 |
| 5,661,871 | 9/1997 | Scorsiroli | 15/250.451 |

FOREIGN PATENT DOCUMENTS

| 1942345 | 3/1971 | Germany . |
| 4319139A1 | 12/1994 | Germany . |
| 4320637 | 1/1995 | Germany . |
| 95/23714 | 9/1995 | WIPO . |

Primary Examiner—Gary K. Graham
Attorney, Agent, or Firm—Michael J. Striker

[57] ABSTRACT

A wiper blade is proposed, which is a part of the windshield wiper system of motor vehicles and is used for cleaning windshields of motor vehicles. The wiper blade has an elongated wiping strip, which is held by a support frame and can be moved, stressed in the direction toward the windshield to be wiped, crosswise in respect to its longitudinal extension over the windshield. Viewed in cross section, the wiping strip has an elongated head strip held by the support frame, and an elongated sweeping strip connected with the latter, on whose side facing away from the head strip an elongated wiping lip strip, which rests against the windshield, is fastened via an elongated tilting strip, wherein for distributing the contact load, elongated spring means made of an elastic material are disposed inside the head strip. For stiffening the head strip, the spring means are constituted by at least two rod-like elements, which are arranged in a plane, which is at least approximately parallel with the wiping plane, and at a distance from each other.

3 Claims, 1 Drawing Sheet

U.S. Patent  Sep. 8, 1998  5,802,663
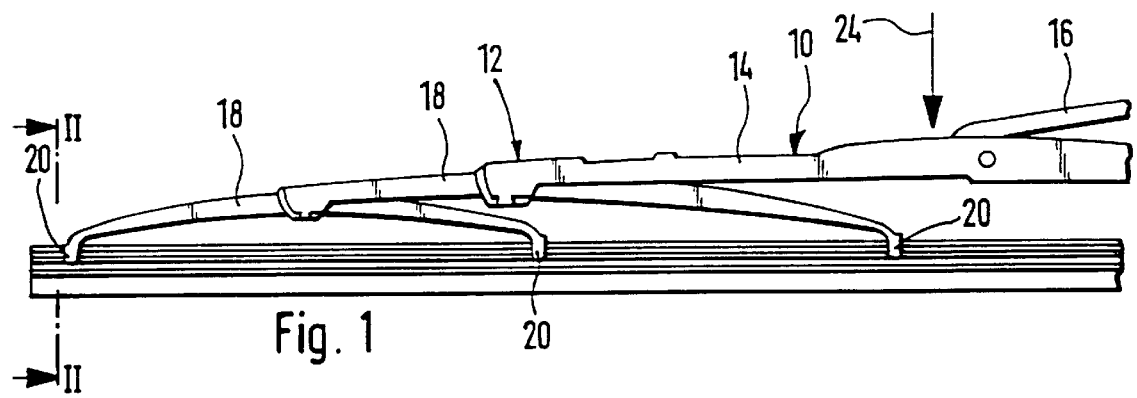
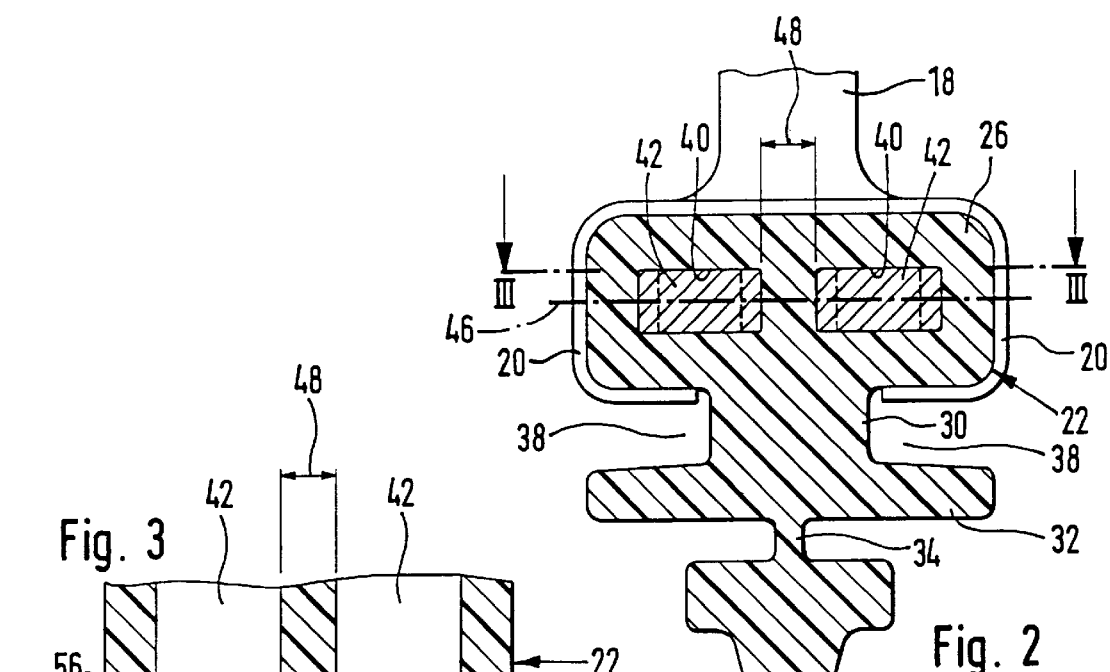
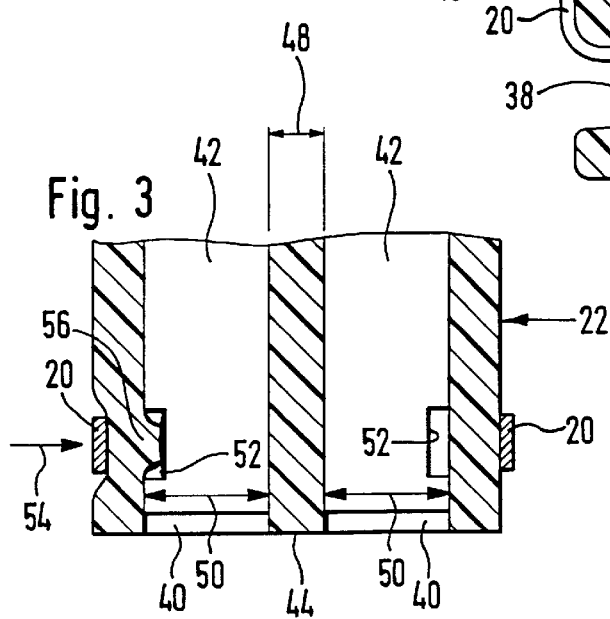
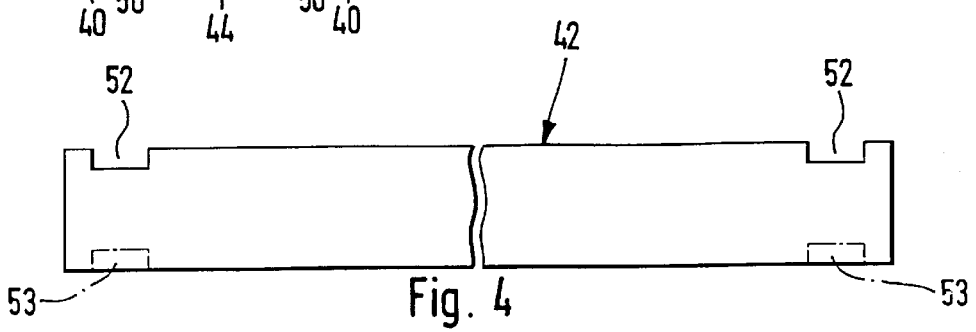

WIPER BLADE WINDSHIELDS OF MOTOR VEHICLES

BACKGROUND OF THE INVENTION

The invention is based on a known wiper blade (DE 4319139 A1), wherein for distributing the contact pressure a single spring rail is arranged as spring element in the head strip.

However, if it is necessary, for example, to provide a soft material mixture for the wiping strip, this can result in an impermissibly large twisting of the head strip in respect to the other strip areas during the wiping operation, in particular while wiping a not sufficiently moistened windshield surface, so that the sweeping strip touches the windshield surface. Because of the increase in friction between the windshield and the wiping strip caused by this, it is possible for the head strip to be levered out of the support frame, so that the wiper device no longer can do its job. Widening the spring rail cannot remove this shortcoming without disadvantages, since the increase in the stiffness of the spring rail connected with this could hamper the conformation of the wiping strip to the continuously changing windshield contour. A simultaneous decrease in the thickness of the spring rail would make the easy assembly capacity of the spring rail questionable.

SUMMARY OF THE INVENTION

In contrast to this, the spring means of the wiper blade in accordance with the invention are constituted by several—at least two—rod-like spring elements which are arranged in a plane, which is at least approximately parallel with the wiping plane, and parallel with each other. Because of this it is possible to place each one of these rod-like elements separately into the longitudinal edge areas of the head strip, which are gripped by the support frame. The danger of the wiping strip being levered out of the support frame is prevented because of the reinforcement connected with this. The total width of the two spring elements which is effective in the stiffening of the head strip can be easily adapted to the—regarding the conformation of the wiping strip to the windshield contour—important requirements.

To this end it has been shown to be practical that the spring elements are designed to be rectangular in cross section. Thus, extended leaf springs result which can be manufactured particularly simply, for example from spring band steel.

A particularly simple, possibly even automatic assembly of the spring elements results if, in a further development of the invention, the elements are placed in longitudinal channels which are closed on all sides and are provided in the head strip and terminate at the two front faces of the head strip.

It is possible to achieve the simple securing against a longitudinal displacement of the spring elements in the head strip, if furthermore the rod-like, elongated spring elements are provided with at least one lateral recess, which is associated with one of the holding claws of the support frame, which embrace the head strip.

In order to simultaneously obtain security against longitudinal displacement of the wiping strip in respect to the support frame, in a further embodiment of the invention the holding claw of the support frame pushes the area of the head strip constituting the wall of the longitudinal channel, which is embraced by it, into the lateral recess of the elongated field means.

Further advantageous embodiments and improvements of the invention can be drawn from the following description of an exemplary embodiment of the invention, which is represented in the associated drawings.

BRIEF DESCRIPTION OF THE DRAWINGS

For a detailed explanation of the invention,

FIG. 1 shows a partial side view of a wiper blade,

FIG. 2 a section through the wiper blade in FIG. 1 along the line II—II in an enlarged representation, FIG. 3 a section through the arrangement in FIG. 2 along the line III—III, not shown to scale, and FIG. 4 the representation, not to scale, of a spring element which is part of the wiper blade.

DESCRIPTION OF THE PREFERRED EMBODIMENT

A wiper blade 10, partially represented in FIG. 1, has in a manner known per se a multi-section elongated support frame 12. In the exemplary embodiment, the members of the support frame are formed by a main hoop 14, which is hinged on the free end of a driven wiper arm 16. Furthermore, so-called lower or claw hoops 18, which are hingedly connected with each other, are part of the support frame 12. The claw hoop construction 18 itself is also hingedly connected with the main hoop 14. With holding claws 20 disposed on their free ends, the claw hoops embrace an elongated, elastic wiping strip 22. The wiper blade 10 is stressed by the wiper arm 16 in the direction of the arrow 24 (FIG. 1) in respect to the windshield surface to be wiped. During the wiping operation the wiper blade 10 is moved crosswise in respect to its longitudinal extension over the surface 28 of a windshield 29 to be wiped.

The structure of the wiping strip 22 can be seen in FIG. 2 in particular. It has a head strip 26, which is rectangular in cross section, which makes a transition into a contraction 30 toward the windshield surface 28. A widening 32, which can also be called a sweeping strip, follows the contraction 30 at a distance from the head strip 26. A wiper lip strip 36 is elastically connected with the sweeping strip 32 via a narrow tilting strip 34. As can be furthermore seen from FIG. 2, two longitudinal grooves, which are located opposite each other and allow the assured gripping of the head strip 26 by the holding claws 20 of the support frame, result between the head strip 26 and the sweeping strip 32 because of the just described embodiment of the wiping strip. Finally, FIG. 2 shows that two longitudinal channels 40 are disposed inside the head strip 26, which are used to receive spring means 42. In the exemplary embodiment, these are constituted by two elongated, rod-like spring elements, rectangular in cross section, made of an elastic material. For example, they can be made of spring band steel, so that the spring means can also be called spring rails. FIG. 3 shows that the longitudinal channels 40 terminate at the two front faces 44 of the wiping strip 22. Although only the one end of the wiping strip is represented in FIG. 3, it should be stated here that the other end of the wiping strip 22 is correspondingly embodied.

The wiping strip itself has been manufactured by means of an extrusion process, which is described in DE 4319139 A1. Reference is expressly made to this copy, so that the disclosure of this reference is also used in the further disclosure of the instant patent application. This method assures that the wiping strip 22 has a constant cross section over its entire longitudinal extension. This also applies to the two longitudinal channels 40.

The two longitudinal channels are arranged in the head strip 26 in a plane, which extends at least approximately parallel with the wiping plane. The wiping plane is indicated in FIG. 2 by the windshield surface 28, while the arrangement plane for the two longitudinal channels 40 is represented by a dot-dashed line 46. FIG. 2 furthermore shows that the two receiver channels 40 for the two spring rails 42 are disposed at a distance 48 from each other. This has the advantage that the cross section of the spring rails 42 can be matched to the requirements already explained at the outset. A further advantage of this embodiment is to be seen in that the channel width 50 (FIG. 3) can be kept within a range which is amenable to hollow chamber extrusion as offered in the above mentioned publication. It is furthermore possible by means of an appropriate matching of the distance 48 and the width of the longitudinal channels 50, which is matched to the width of the spring rails 42, to adapt the required stiffness of the head strip 26 to the requirements.

FIG. 4 shows the design of a spring rail 42. On each of its two ends it has a lateral recess 52, which is used as a safety against longitudinal displacement of the spring rail 42 in the head strip 26. It can be seen in FIG. 3 how the spring rail 42 (right spring rail) inserted into the channel 40 lies in the longitudinal channel 40. The holding claw 20 is now pushed inward in the direction of the arrow 54 (see the left spring rail) for securing the spring rail 42 in the longitudinal channel 40, so that this holding claw of the chassis 12 pushes the area of the wall 56 of the longitudinal channel 40 it grips into the lateral recess 52 of the spring rail 42. By means of this the securing of the spring rail 42 in the wiping strip 22 is achieved, for one. Further than that it is also assured that the wiping strip 22, together with the spring rails 42 situated in its head strip 26, are connected secure against loss with the support frame 12 of the wiper blade 10. To this end it is sufficient if a single pair of holding claws 20 is pressed together in the described manner (arrow 54), so that each claw pushes a corresponding wall area into the recess 52 of each spring rail 42.

In connection with an automatic assembly of the spring rails 42 in their longitudinal channels 40, it can be advantageous if each spring rail is provided with two recesses 52 which are located opposite each other. Such a design of the spring rails is indicated in FIG. 4 by the additionally recesses 53, indicated in dash-dotted lines.

I claim:

1. A wiper blade (10) for windshields of motor vehicles, said blade comprising an elongated wiping strip (22), which is held by a support frame (12) and can be moved, stressed in a direction of the longitudinal extension over the windshield, wherein the wiping strip (22) has an elongated head strip (26) which is held by the support frame (12), and an elongated sweeping strip (32) connected with it, on whose side facing away from the head strip (26) an elongated wiper lip strip (36) resting against the windshield is fastened by means of an elongated tilting strip (34), wherein elongated spring means (42) made of an elastic material are disposed inside the head strip (26) for distibuting a contact load (24), characterized in that the spring means are constituted by at least two flat rod-shaped spring elements (42) each defining opposed-edges, which are located in a plane (46), which is at least approximately parallel with a wiping plane (28), and at a distance (48) from each other, and the rod-shaped elongated spring elements (42) are each provided with at least one lateral recess (52,53) in an edge thereof, said recesses opening outwardly from one another, said recesses cooperate with a holding claw (20) of the support frame (12) embracing the head strip (26) wherein the holding claw (20) of the support frame (12) pushes an area of the head strip (26), which forms a wall (56) of a longitudinal channel (40) and around which it grips, into the lateral recess (52,53) of the elongated spring means (42).

2. The wiper blade in accordance with claim 1, characterized in that the spring elements (42) are embodied rectangular in cross section.

3. The wiper blade in accordance with claim 1, characterized in that the spring elements (42) terminate in the longitudinal channels (40), which are closed on all sides and provided in the head strip (26) and terminate at two front faces (44) of the head strip (26).

\* \* \* \* \*